US 8,965,717 B2
Feb. 24, 2015

(12) United States Patent
Lee (10) Patent No.: US 8,965,717 B2
(45) Date of Patent: Feb. 24, 2015

(54) CARBON EMISSION TRACKER AND TRACKING SYSTEM (75) Inventor: Yu-Lung Lee, New Taipei (TW)

(73) Assignee: Powertech Industrial Co., Ltd., New Taipei (TW)

(*) Notice: Subject to any disclaimer, the term of this patent is extended or adjusted under 35 U.S.C. 154(b) by 982 days.

(21) Appl. No.: 13/088,523

(22) Filed: Apr. 18, 2011

(65) Prior Publication Data
US 2012/0016605 A1 Jan. 19, 2012

(30) Foreign Application Priority Data

Jul. 16, 2010 (TW) ............... 99123462 A
Aug. 20, 2010 (TW) ............... 99127990 A
Jan. 28, 2011 (TW) ............... 100103336 A (51) Int. Cl.
G01R 21/00 (2006.01)
H02B 1/00 (2006.01)
H01R 13/66 (2006.01)
G06Q 50/06 (2012.01)
G01D 4/00 (2006.01)

(52) U.S. Cl.
CPC ............... *G06Q 50/06* (2013.01); *G01D 4/002* (2013.01); *Y02B 70/3266* (2013.01); *Y02B 90/241* (2013.01); *Y02B 70/343* (2013.01); *Y04S 20/242* (2013.01); *Y04S 20/32* (2013.01); *Y04S 20/34* (2013.01); *Y04S 20/38* (2013.01)
USPC .......... 702/60; 361/600; 439/620.21

(58) Field of Classification Search
USPC ......... 702/60, 57, 61–62, 64–65, 81, 84, 127, 702/182–183, 188–189; 323/234, 241, 318, 323/364, 367, 369; 361/600–601, 622, 641, 361/659–661; 307/11, 29, 31, 112–113, 307/125, 130–131, 132 E, 139–140; 439/620.01, 620.04, 620.21; 700/286, 700/291–292, 295
See application file for complete search history.

(56) References Cited

U.S. PATENT DOCUMENTS

2010/0070217 A1* 3/2010 Shimada et al. ............... 702/62
2010/0076616 A1 3/2010 Kagan

FOREIGN PATENT DOCUMENTS

| CN | 101102049 A | 1/2008 |
| CN | 201021932 Y | 2/2008 |
| CN | 101394099 A | 3/2009 |
| JP | 2002-44882 A | 2/2002 |
| JP | 2005-180755 A | 7/2005 |

(Continued)

OTHER PUBLICATIONS

Communication From the Taiwan Patent Office Regarding a Counterpart Application Dated (Taiwan Year 102) Jul. 29, 2013.

*Primary Examiner* — Toan Le
(74) *Attorney, Agent, or Firm* — Rosenberg, Klein & Lee (57) ABSTRACT

A carbon emission tracker is disclosed. The carbon emission tracker includes a main body, a power input interface, a power output interface, a power detecting unit, a communication unit, a memory unit, and a processing unit. The power detecting unit is configured to detect an electricity usage of an electrical appliance. The processing unit is configured to aggregate power consumption data over a time period and to store the power consumption data for the time period to the memory unit. The processing unit transmits the power consumption data of the memory unit to a data center through the communication unit. The power consumption data further includes identification data of the electrical appliance.

20 Claims, 11 Drawing Sheets

(56) References Cited

FOREIGN PATENT DOCUMENTS

| | | |
|---|---|---|
| JP | 2006-191768 A | 7/2006 |
| JP | 2008-79410 A | 4/2008 |
| JP | 2009-245360 A | 10/2009 |
| TW | M348951 U | 1/2009 |
| TW | 200919862 A | 5/2009 |
| WO | 2009/097400 A1 | 8/2009 |
| WO | 2010/033563 A1 | 3/2010 |

* cited by examiner

CARBON EMISSION TRACKER AND TRACKING SYSTEM

BACKGROUND OF THE INVENTION

1. Field of the Invention

The instant disclosure relates to a carbon emission tracker and carbon emission tracking method of an electrical appliance; more particularly, to a carbon emission tracker coupled to a power input end of the electrical appliance that is capable of periodically reporting a power consumption data to a data center and a tracking method thereof.

2. Description of Related Art

Impact of emission of carbon dioxide as the result of human activities on this planet has been heavily discussed and widely regarded as the main culprit causing abnormalities in the environment and weather. The amount of the emission of the carbon dioxide may partially depend on operations, actual usage time, and service life of electrical appliances. To track the emission of the carbon dioxide, several equipments have been placed into the stream of the commerce. A successful and accurate tracking of the carbon dioxide emission may help facilitate allocation of so-called carbon dioxide tax/credit.

Also, the tracking of the carbon dioxide emission may help manufacturers of the electrical appliances determine corresponding warranties thereof as the carbon dioxide emission generally may be associated with actual usage time of the appliances.

SUMMARY OF THE INVENTION

The goal of the instant disclosure is to provide a carbon emission tracker, which may be connected to a power input end of an electrical appliance. The carbon emission tracker is configured to detect an electricity usage of the electrical appliance, record power consumption data for each time period, and to periodically submit the power consumption data to a data center.

Another aspect of the instant disclosure is to provide a carbon emission tracker, which may be connected to the power input end of the electrical appliance. The carbon emission tracker may submit the power consumption data of the electrical appliance periodically to a data center. The data center may thus analyze the power consumption data, and monitor the electrical appliance for any abnormality. Thus, appropriate service supports could be arranged if abnormality is found.

A further aspect of the instant disclosure is to provide a carbon emission tracker, which may be connected to the power input end of the electrical appliance. The carbon emission tracker may periodically submit power consumption data of the electrical appliance to the data center. The data center may analyze the power consumption data by derive an actual usage time of the electrical appliance. Thus, the manufacturers or service providers may determine proper warranty based on the actual usage time of the electrical appliance. To achieve the above objective, the instant disclosure provides a carbon emission tracker coupled to the power input end of an electrical appliance.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1A:
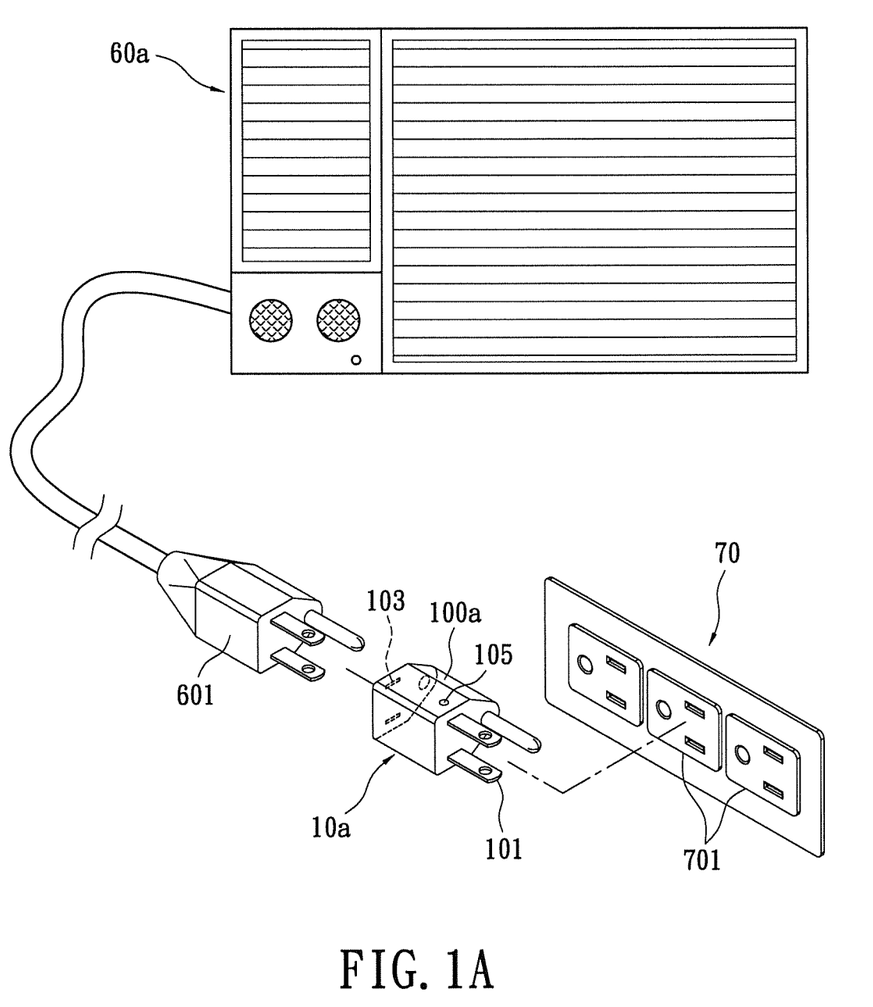
FIG. 1A is a schematic view of a carbon emission tracker according to a first embodiment of the instant disclosure.

Please refer to FIG. 1A, which shows a carbon emission tracker 10a according to a first embodiment of the instant disclosure. The carbon emission tracker 10a is connected between a power input end 601 of an electrical appliance 60a and a power output end 701 of a power supply unit 70. The carbon emission tracker 10a comprises a main body 100a, a power input interface 101, a power output interface 103, and a communication unit 105. The power input interface 101 and the power output interface 103 are disposed on the main body 100a. The power output interface 103 is coupled to the power input interface 101. The power input interface 101 may selectively connect to the power output end 701. Likewise, the power output interface 103 may selectively connect to the power input end 601. The communication unit 105 is disposed on the main body 100a internally.

The carbon emission tracker 10a receives power through the power input interface 101 from the power output end 701. Power is supplied to the electrical appliance 60a through the power output interface 103. The carbon emission tracker 10a is configured to detect an actual power consumption of the electrical appliance 60a when the power is supplied to the electrical appliance 60a. By aggregating the actual power consumption over a time period, the carbon emission tracker 10a may obtain a corresponding power consumption data associated with the electrical appliance 60a. The power consumption data of each time period is then recorded. For example, the recorded power consumption data may be indicating daily power consumption of the electrical appliance 60a, or may be indicative of weekly power consumption of the same. An electricity usage data includes an energy use for the time period and the aggregated usage times or days, etc. The energy use may be calculated according to formula (1) as follows:

$$\text{Energy Use} = \text{Actual Power Consumption} \times \text{Time Period}/1000 \quad (1)$$

The unit of the actual power consumption may be wattage/hour, the unit of time period could be hourly, and the unit of the energy use is kilowatt.

The carbon emission tracker 10a may have the aforementioned time period set in advance. Alternatively, when the carbon emission tracker 10a receives the power the carbon emission tracker 10a may be configured by a data center (not shown) through the communication unit 105 regarding the setting of the time period. Through the communication unit 105, the carbon emission tracker 10a may periodically submit the recorded power consumption data to the data center, and the data center would calculate corresponding carbon output accordingly. The power consumption data may include identification data of the electrical appliance 60a, such as brand type, model type, serial number, specs, power consumption rating, etc. The identification data of the electrical appliance 60a may be pre-stored within the carbon emission tracker 10a.

The power consumption data may further indicate ambient condition of the electrical appliance 60a. For example, the carbon emission tracker 10a may also detect ambient properties of the electrical appliance 60a at the time of detecting the actual power consumption of the electrical appliance 60a. The ambient properties may be temperature, humidity, or combination thereof. Thus, data of the ambient properties that corresponds to the power consumption of the electrical appliance 60a may be obtained. Via the data center, the manufacturer or the consumer may analyze relationships between the carbon output and the ambient conditions. Usually, if the ambient temperature is too high, the electrical appliance 60a tends to operate less efficiently, thus drawing more electrical energy. Therefore, the manufacturer or the consumer may improve efficiency of operations of the electrical appliance 60a on basis of the power consumption data. For example, the electrical appliance 60a may be moved to another position of lower temperature in order to reduce the power consumption thereof.

The communication unit 105 may be a wired or wireless network module. For a wired network module, the communication unit 105 comprises a power line communication (PLC) module. The power consumption data of the electrical appliance 60a is carried over the utility transmission lines. For a wireless network module, the communication unit 105 may a wireless network card, and thus the power consumption data is transmitted wirelessly to the data center.

The carbon emission tracker 10a may be implemented in terms of a plug adapter. More specifically, the main body 100a may be the body of the plug adapter. The power input interface 101 may be the prongs, and the power output interface 103 may be conductive slots. The electrical appliance 60a may be an air conditioner, and the power input end 601 may be a power plug of the air conditioner. The power supply unit 70 may be wall sockets, and the power output end 701 may be slots for delivering alternating current.

It is worth noting that the main body 100a may not have any touch-keys or buttons so that integrity of the power consumption and the carbon output may be maintained.

Figure 1B:
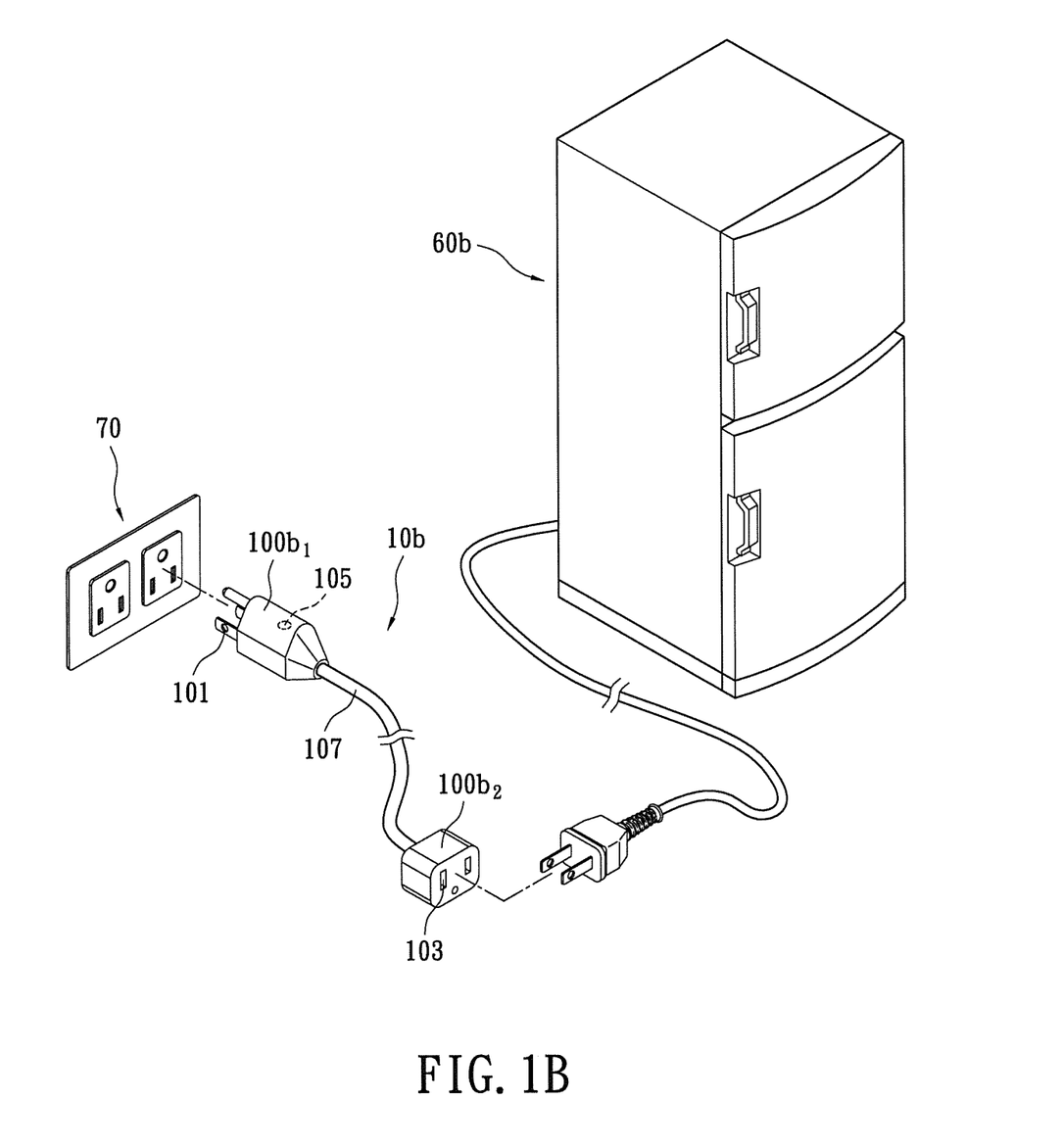
FIG. 1B is a schematic view of a carbon emission tracker according to a second embodiment of the instant disclosure.

Please refer to FIG. 1B, which shows a schematic view of a carbon emission tracker 10b according to a second embodiment of the instant disclosure. The carbon emission tracker 10b is similar to the carbon emission tracker 10a of FIG. 1A in general. The difference between the carbon emission trackers in FIGS. 1A and 1B lies in the carbon emission tracker 10b comprises a first body $100b_1$ and a second body $100b_2$. The first body $100b_1$ is connected by a cable 107 to the second body $100b_2$. The power input interface 101 is disposed on the first body $100b_1$, and the power output interface 103 is disposed on the second body $100b_2$. The power input interface 101 is coupled to the power output interface 103 by the cable 107. The communication unit 105 may be disposed internally on the first body $100b_1$ or the second body $100b_2$.

The carbon emission tracker 10b may set an electrical appliance 60b and the power supply unit 70 further apart from each other. The electrical appliance 60b may be a refrigerator in one implementation.

Figure 1C:
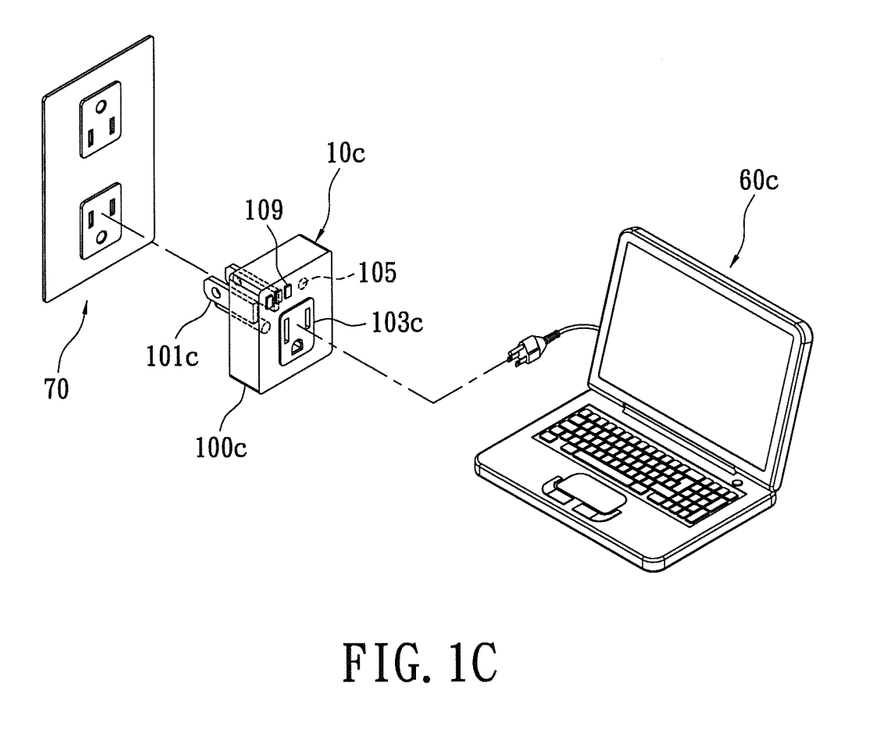
FIG. 1C is a schematic view of a carbon emission tracker according to a third embodiment of the instant disclosure.

Please refer to FIG. 1C, which shows a carbon emission tracker 10c according to a third embodiment of the instant disclosure. The carbon emission tracker 10c is generally similar to the carbon emission tracker 10a of FIG. 1A. One difference between the carbon emission trackers 10a and 10c is the carbon emission tracker 10c is a wall-mounted socket. In addition, a main body 100c includes an indication unit 109 to show the state of the communication unit 105 or the electricity usage of an electrical appliance 60c.

The indication unit 109 may be lights for indicating signal quality of the communication unit 105, or power supply status of a power output interface 103c.

Figure 1D:
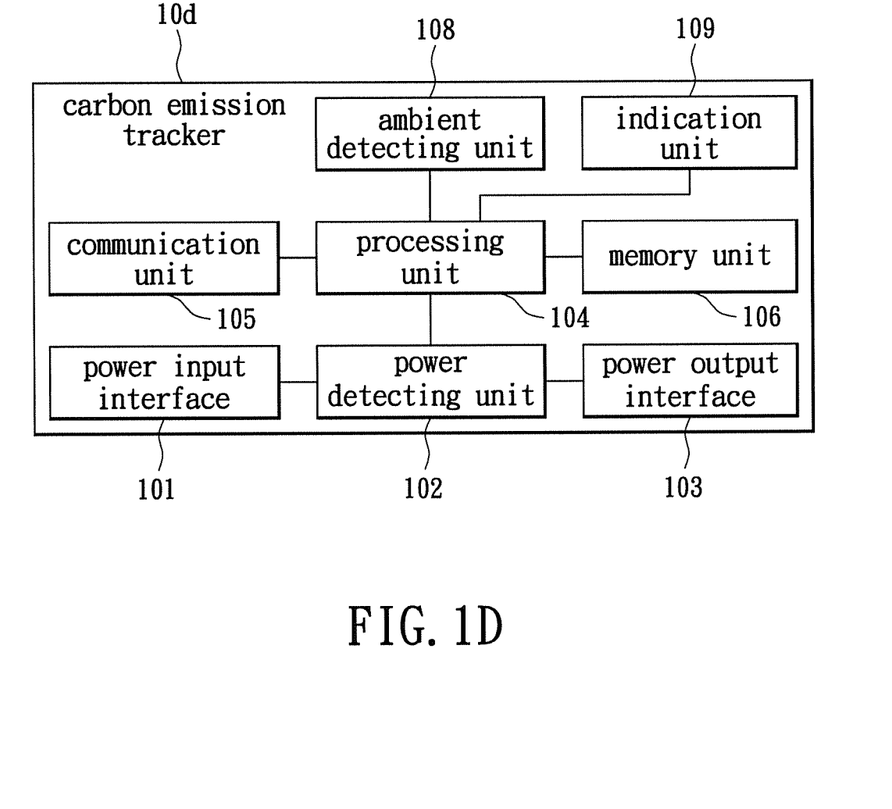
FIG. 1D is a function block diagram for the carbon emission tracker, according to one embodiment of the instant disclosure.

Please refer to FIG. 1D, which shows a function block diagram for a carbon emission tracker 10d according to one embodiment of the instant disclosure. The carbon emission tracker 10d comprises the power input interface 101, the power output interface 103, a power detecting unit 102, a processing unit 104, the communication unit 105, a memory unit 106, an ambient detecting unit 108, and the indication unit 109. The power detecting unit 102 is disposed between the power input interface 101 and the power output interface 103. The processing unit 104 is coupled to the power detecting unit 102, the communication unit 105, the memory unit 106, the ambient detecting unit 108, and the indication unit 109.

The power detecting unit 102 may further include voltage detector circuit and a current sensor for detecting the actual power consumption of the electrical appliance.

The memory unit 106 may be a flash memory or an electrically-erasable programmable read-only memory (EEPROM), to store the identification data of the electrical appliance. In one implementation, the identification data may be stored to the memory unit 106 in advance. In another implementation, the identification data may be uploaded remotely to the memory unit 106 via the communication unit 105 of the network.

The processing unit 104 aggregates the actual power consumption detected by the power detecting unit 102. Thus, the power consumption data for a time period of the electrical appliance may be obtained. The power consumption data of each time period may be stored to the memory unit 106. The processing unit 104 may periodically submit the stored power consumption data of the memory unit 106 to the data center (not shown) via the communication unit 105. Based on the received power consumption data, the data center calculates the carbon output, while the calculated carbon output may correspond to the electrical appliance as the power consumption data may include the identification data of the electrical appliance.

The carbon output may be calculated by formula (2) as follows, wherein the unit of carbon output is kilogram.

$$\text{Carbon Output} = \text{Energy Use} \times 0.785 \qquad (2)$$

Based on the state of the communication unit 105, the processing unit 104 controls the indication unit 109 to output indicating signals. For example, when the indication unit 109 is lights, based on the signal reception quality of the communication unit 105, the processing unit 104 may control the lights to illuminate different colors or may enable different numbers of lights to illuminate. When the signal reception quality is desirable, a green light may be enabled. And that more green lights are enabled may suggest the better signal reception quality. Alternatively, the processing unit 104 may also base on the state of electricity usage of the electrical appliance to control the indication unit 109 for outputting the indicating signal.

The ambient detecting unit 108 may be a thermometer, a humidity gauge, or a combination thereof. While detecting the actual power consumption by the power detecting unit 102, the carbon emission tracker 10*d* may detect the ambient state of the electrical appliance by the ambient detecting unit 108 simultaneously, and data of ambient state may be stored to the memory unit 106. It is worth noting that the power consumption data may also include the ambient state data of the electrical appliance, Please refer to FIG. 1E, which shows a block diagram of a carbon emission tracking system 1 according to one embodiment of the instant disclosure. The carbon emission tracking system 1 includes a plurality of carbon emission trackers 10*a*, 10*b*, 10*c*, 10*d*, 10*e*, and 10*f*, a first access point (AP) 14*a*, a second access point (AP) 14*b*, and a data center 17. The carbon emission trackers 10*a*, 10*b*, 10*c*, and 10*d*, are disposed in a first local area network (LAN) 12*a*, wherein the carbon emission trackers 10*e*, and 10*f* are placed within a second local area network (LAN) 12*b*. The first LAN 12*a* and the second LAN 12*b* may be partially overlapped. In other words, the carbon emission tracker 10*d* may be in the first LAN 12*a* and the second LAN 12*b* simultaneously. The first AP 14*a* is connected to a first wide area network (WAN) 16*a*, and the second AP 14*b* is connected to a second wide area network (WAN) 16*b*.

Figure 1E:
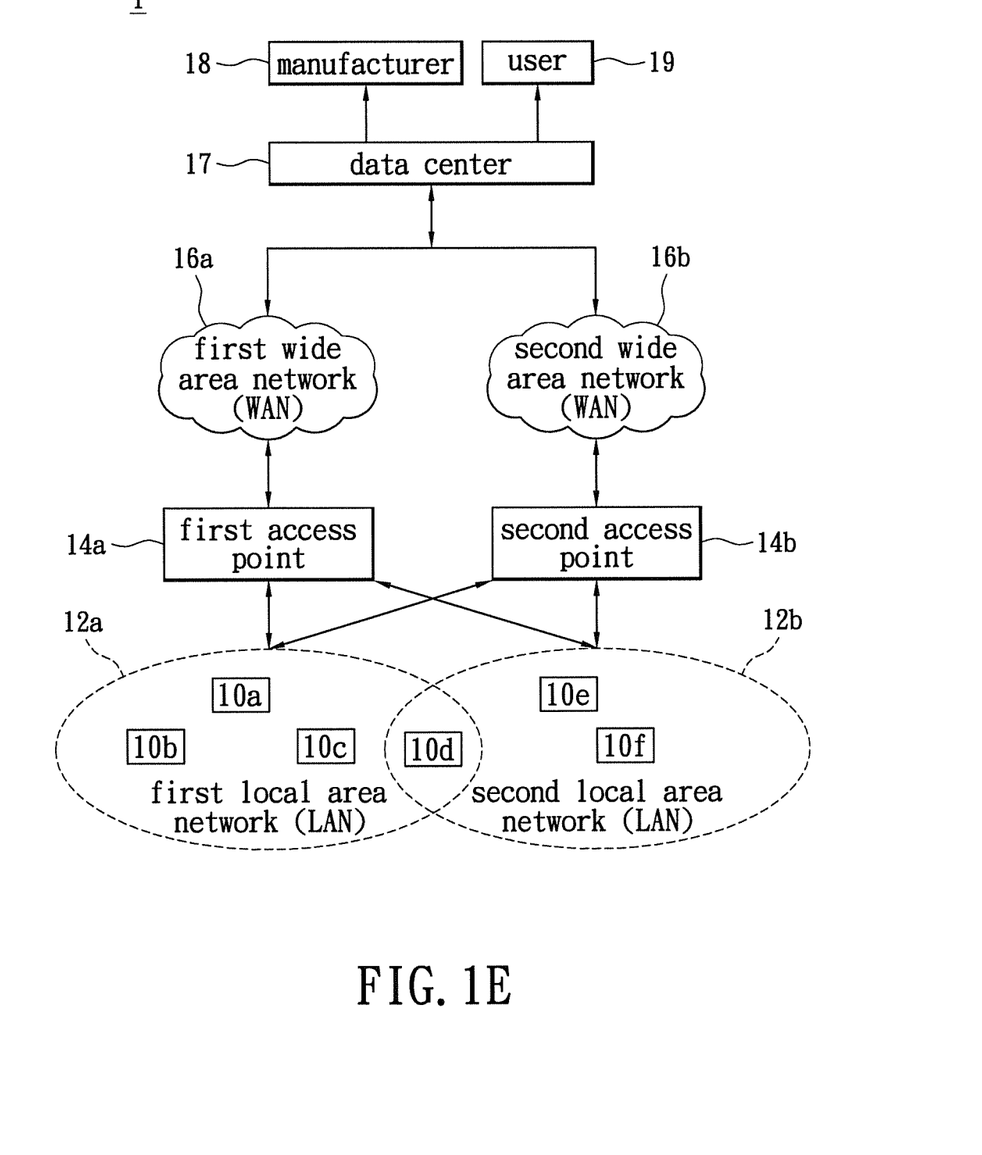
FIG. 1E is a block diagram of a carbon emission tracking system, according to one embodiment of the instant disclosure.

Each carbon emission tracker 10*a*, 10*b*, 10*c*, 10*d*, 10*e*, and 10*f* is connected to the data center 17 in a network when they are powered. Each carbon emission trackers 10*a*, 10*b*, 10*c*, 10*d*, 10*e*, and 10*f* may periodically submit the power consumption data of respective time periods to the data center 17. The data center 17 may therefore calculate the carbon outputs accordingly. The data center 17 can compare the received power consumption data to a pre-determined power consumption data, to determine if the electrical appliances connected to the respective carbon emission trackers 10*a*, 10*b*, 10*c*, 10*d*, 10*e*, and 10*f* operate normally. If not, a service support may be arranged. Also, the data center 17 may compile the actual usage times of the electrical appliances. Thereby, the manufacturer 18 (or the service provider) may rely on the actual usage time of the electrical appliance to determine the product warranty.

The first AP 14*a* is for receiving the power consumption data of the carbon emission trackers 10*a*-10*d* of the first LAN 12*a* for the plurality of electrical appliances. The received power consumption data for the plurality of electrical appliances are transmitted to the data center 17, through the communication between the first WAN 16*a* and the data center 17. The second AP 14*b* is for receiving the power consumption data of the carbon emission trackers 10*d*-10*f* of the second LAN 12*b* for the plurality of electrical appliances. Likewise, the received power consumption data for the plurality of electrical appliances are transmitted to the data center 17, through the communication between the second WAN 16*b* and the data center 17. The data center 17 may organize the power consumption data and respective carbon outputs, and compile and store a histogram to a database of the data center 17.

The first AP 14*a* and the second AP 14*b* may be wireless access points, general packet radio service (GPRS) access points, or Wi-Fi access points. The first AP 14*a* and the second AP 14*b* may communicate wirelessly with the carbon emission trackers 10*a* to 10*f*. The first AP 14*a* and the second AP 14*b* connect to the first WAN 16*a* and the second WAN 16*b*, respectively, by routers and modems. The data center 17 may be a web or mail server. The manufacturer 18 or the user 19 can use internet to download history of the power consumption data of the electrical appliances from the database. Thus, the manufacturer may use the retrieved power consumption data of the electrical appliances to determine if abnormality exists. For example, if the power consumption data in the history of the electrical appliances shows spikes, then operational abnormalities likely exist. The manufacturer or service provider may respond accordingly as part of the predictive maintenance.

Figure 1F:
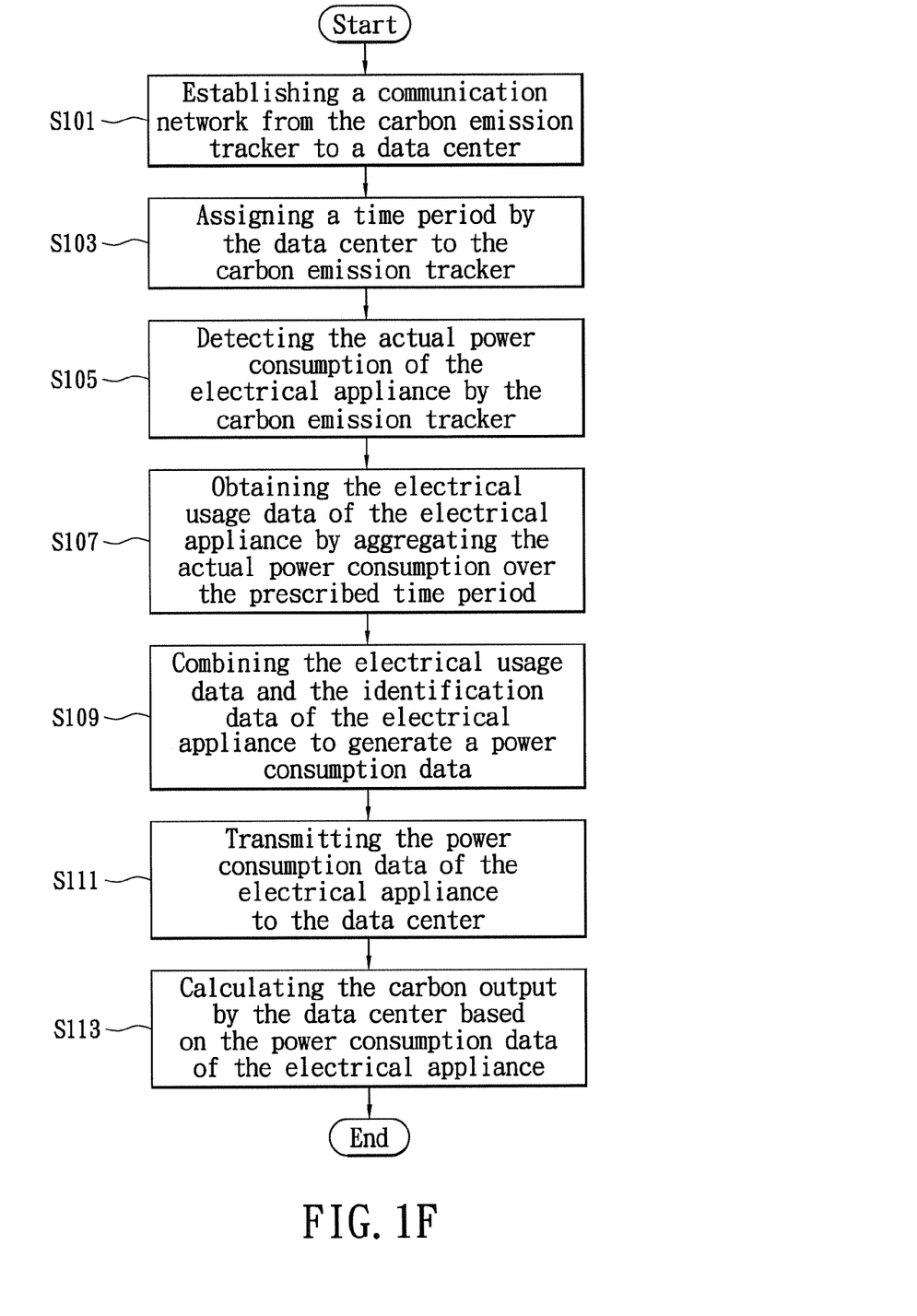
FIG. 1F is a flow chart of a carbon emission tracking method, according to one embodiment of the instant disclosure.

In conjunction with FIGS. 1A to 1E, please refer to FIG. 1F, which shows a flow chart for a carbon emission tracking method according to one embodiment of the instant disclosure. First, when the carbon emission trackers 10*a* and 10*b* connected to the electrical appliances 60*a* and 60*b*, respectively, are powered, a communication network is established from the carbon emission trackers 10*a* and 10*b* to the data center 17 via the APs 14*a*, 14*b* (S101). The carbon emission trackers 10*a* and 10*b* may transmit the identification data of the electrical appliances 60*a* and 60*b* to the data center 17. The data center 17 may assign pre-determined time period parameters to the carbon emission trackers 10*a* and 10*b* (S103). The assigned time period may be set by the manufacturer 18 or the user 19.

The carbon emission trackers 10*a* and 10*b*, once powered, may start detecting the actual power consumption of the electrical appliances 60*a* and 60*b*, or detect the actual power consumption periodically (S105). More specifically, the carbon emission trackers 10*a* and 10*b* may detect the actual power consumption of the electrical appliances 60*a* and 60*b* at ends of the predetermined time periods. The carbon emission tracker 10*a* and 10*b* may thus obtain the electricity usage data of the electrical appliances 60*a* and 60*b* by aggregating the actual power consumption over the predetermined time period (S107).

The carbon emission trackers 10*a* and 10*b* may combine the electricity usage data and the identification data of the electrical appliances 60*a* and 60*b* to generate power consumption data (S109). The power consumption data is stored to the memory unit 106. Periodically, the power consumption data is submitted to the data center 17 through the communication unit 105 (S111).

Based on the power consumption data, the data center 17 may calculate the carbon output of the electrical appliances 60*a* and 60*b* (S113). The calculated carbon output is stored to a database so that it may be download-able by the manufacturer 18 or the user 19. Thus, the manufacturer 18 or the user 19 may utilize the power consumption data of the electrical appliance before proceeding to pay corresponding carbon tax if necessary.

Figure 2A:
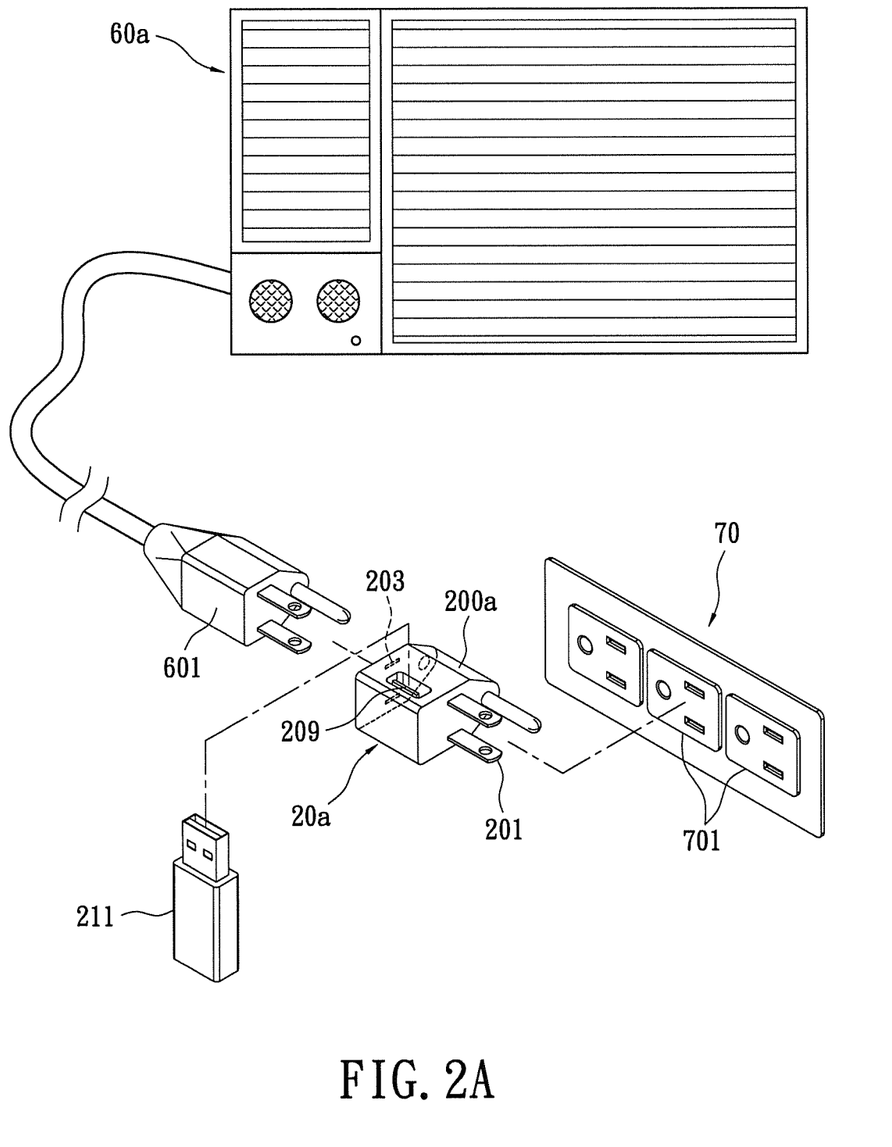
FIG. 2A is a schematic view of a carbon emission tracker according to a fourth embodiment of the instant disclosure.

Please refer to FIG. 2A, which shows a schematic view of a carbon emission tracker 20*a* according to a fourth embodiment of the instant disclosure. The carbon emission tracker 20*a* is generally the same as the carbon emission tracker 10*a* other than a main body 200*a* of the carbon emission tracker 20a includes a data transfer interface 209. In other words, the carbon emission tracker 20a is also disposed between the power input end 601 of the electrical appliance 60a and the power output end 701 of the power supply unit 70.

The data transfer interface 209 may be a memory card slot or a universal serial bus (USB) slot for receiving a data storage unit 211. Meanwhile, the data storage unit 211 may be a memory card (e.g., SD card) or USB-based storage device. The processing unit 104 may store the power consumption data of each time period to the data storage unit 211.

After the data storage unit 211 is removed from the carbon emission tracker 20a, the power consumption data of the data storage unit 211 may be retrieved by cell phones, PDAs, or computers through the data transfer interface 209.

Figure 2B:
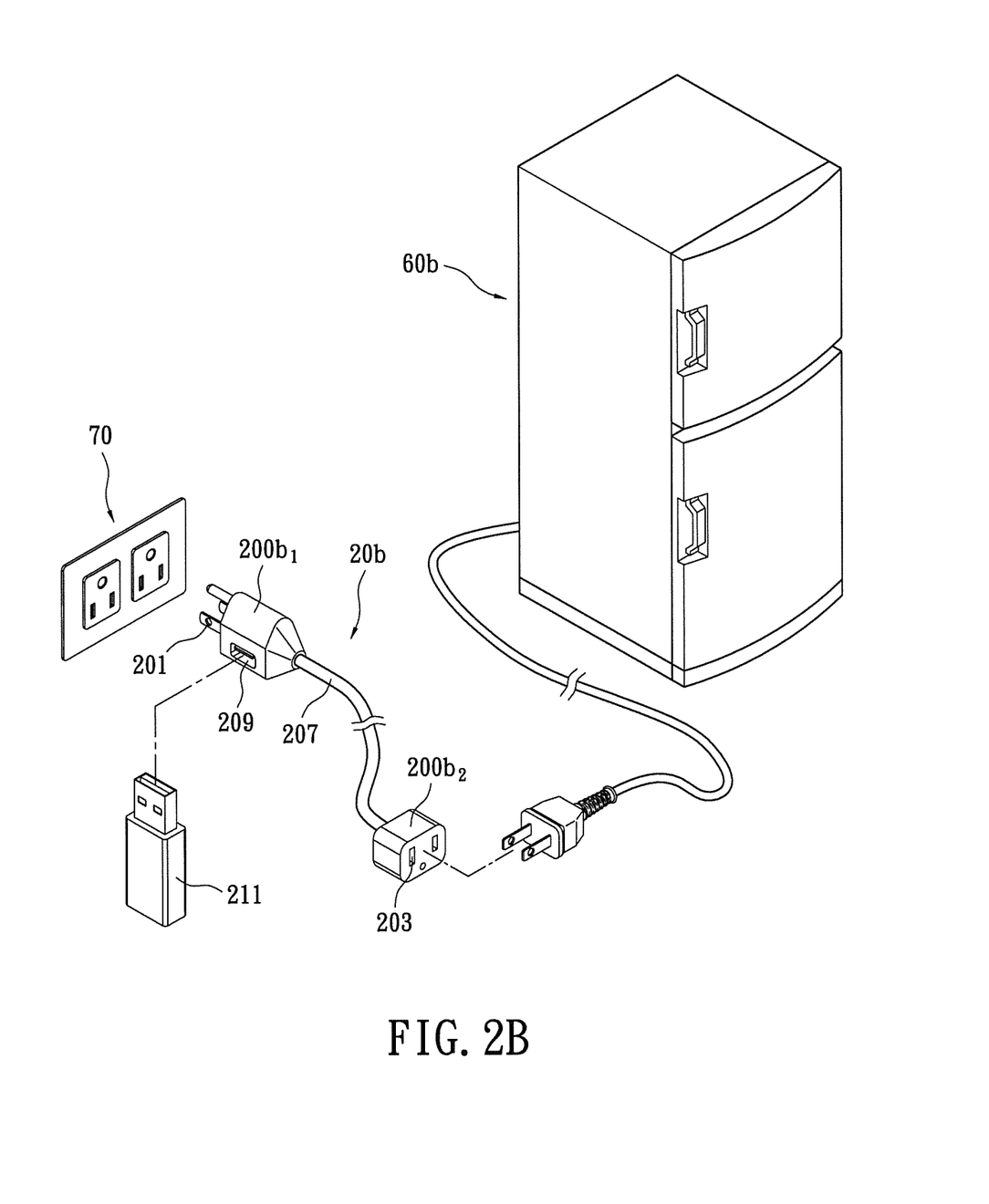
FIG. 2B is a schematic view of a carbon emission tracker according to a fifth embodiment of the instant disclosure.

Please refer to FIG. 2B, which shows a carbon emission tracker 20b according to a fifth embodiment of the instant disclosure. The carbon emission tracker 20b is the same as the carbon emission tracker 10b in general other than the data transfer interface 209 is disposed internally on a first body $200b_1$ or on a second body $200b_2$.

Figure 2C:
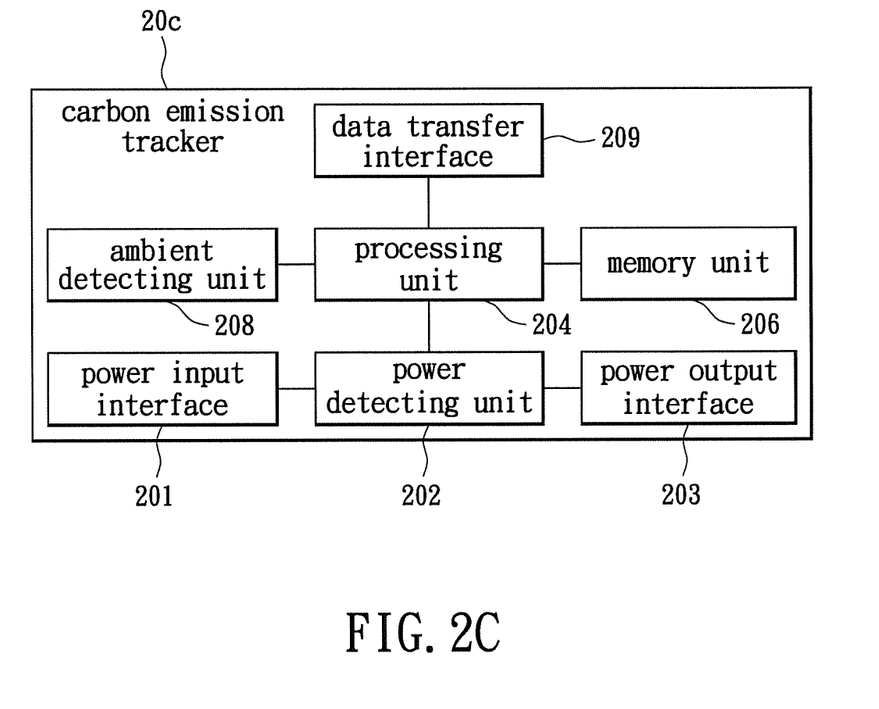
FIG. 2C is a function block diagram of a carbon emission tracker, according to another embodiment of the instant disclosure.

Please refer to FIG. 2C, which shows a function block diagram of a carbon emission tracker 20c according to one embodiment of the instant disclosure. The carbon emission tracker 20c includes the data transfer interface 209 coupled to a processing unit 204.

The processing unit 204 may determine if the data transfer interface 209 is connected to the data storage unit 211. Also, the power consumption data may be stored to the data storage unit 211 through the data transfer interface 209. The identification data of the electrical appliance may be pre-stored to a memory unit 206 or the data storage unit 211. The carbon emission tracker 20c may further include an indication unit (not shown). When the processing unit 204 determines the data storage unit 211 reaches storage capacity thereof, the processing unit 204 may control the indication unit to output an indicating signal, to inform the user of the same.

Figure 2D:
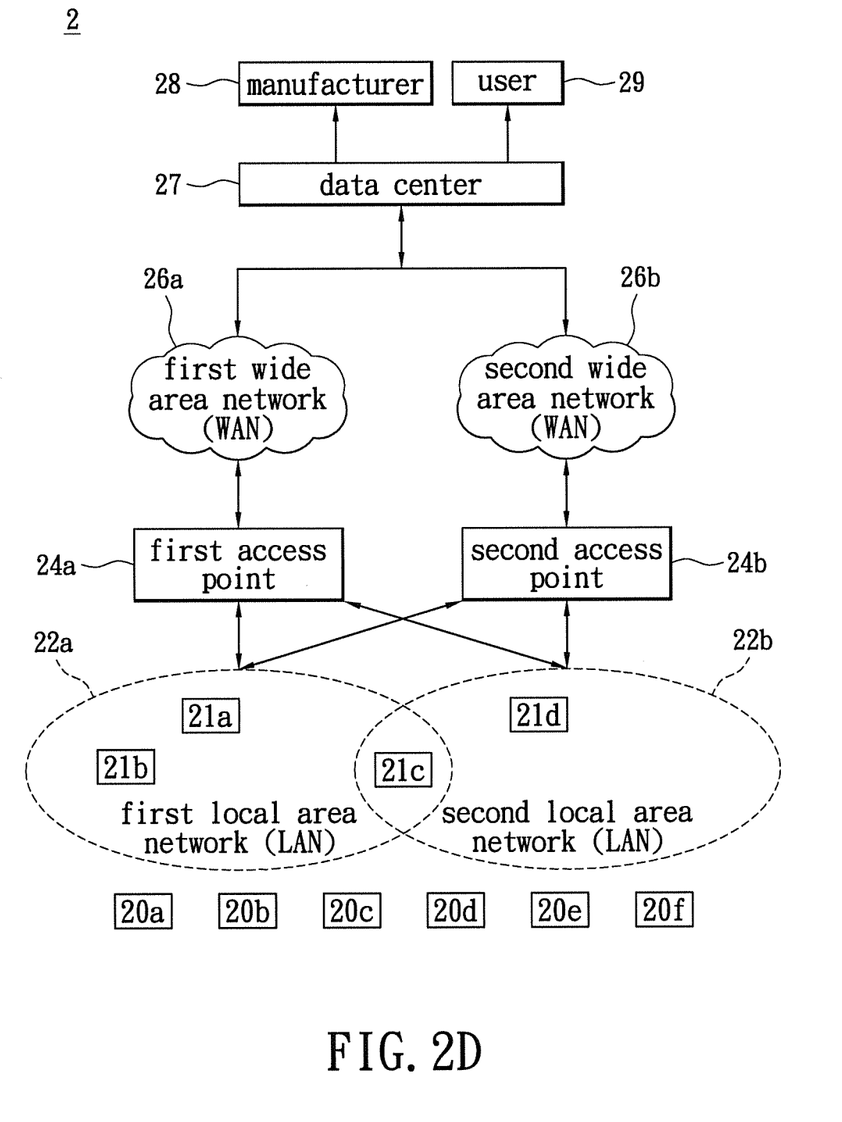
FIG. 2D is a block diagram of a carbon emission tracking system, according to another embodiment of the instant disclosure.

Please refer to FIG. 2D, which shows a block diagram of a carbon emission tracking system 2 according to one embodiment of the instant disclosure. The carbon emission tracking system 2 is the same as the carbon emission tracking system 1 in general except the carbon emission tracking system 2 further includes a plurality of electronic devices 21a, 21b, 21c, and 21d. In particular, the electronic devices 21a, 21b, and 21c may be within a first local area network (LAN) 22a while the electronic devices 21c and 21d are within a second local area network (LAN) 22b. In another implementation, there is no limitation to the placement of the carbon emission trackers 20a, 20b, 20c, 20d, 20e, and 20f. In other words, these carbon emission trackers do not need be within the coverage of the first LAN 22a or the second LAN 22b.

The carbon emission trackers 20a, 20b, 20c, 20d, 20e, and 20f may store the power consumption data of the corresponding electrical appliances to a removable data storage unit (not shown). The electronic devices 21a, 21b, 21c, and 21d may retrieve the power consumption data stored in the data storage unit and transmit the retrieved power consumption data to a data center 27 through a first access point (AP) 24a and a second access point (AP) 24b. The first AP 24a is connected to a first wide area network (WAN) 26a, and the second AP 24b is connected to a second wide area network (WAN) 26b. Based on the power consumption data, the data center 27 may calculate the carbon outputs of the electrical appliances 60a and 60b.

Figure 2E:
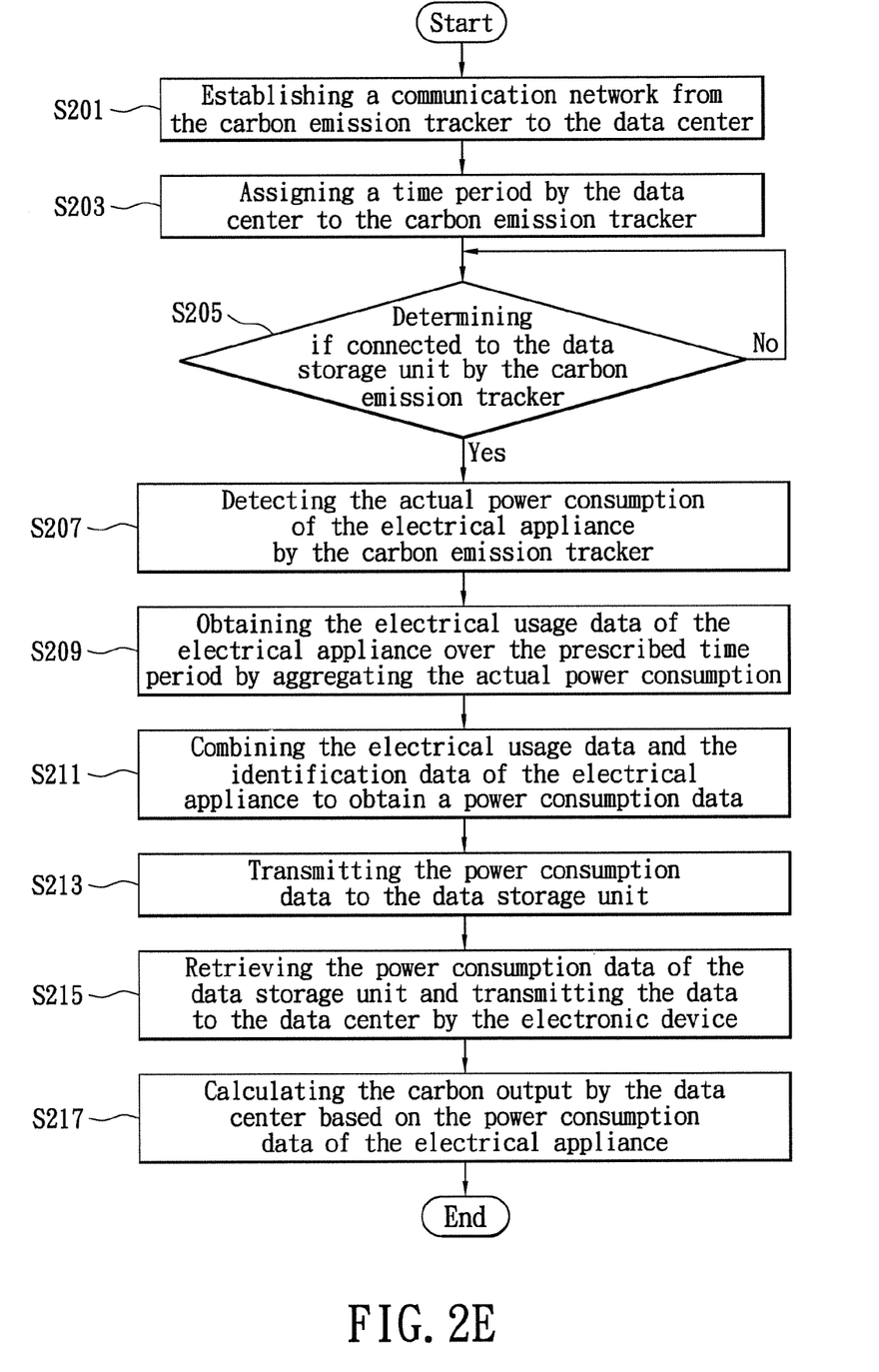
FIG. 2E is a flow chart of a carbon emission tracking method, according to another embodiment of the instant disclosure.

Please refer to FIG. 2E, which shows another flow chart for a carbon emission tracking method according to one embodiment of the instant disclosure. Please also refer to FIGS. 2A to 2D in conjunction with FIG. 2E. When the carbon emission trackers 20a and 20b connected to the electrical appliances 60a and 60b are powered, a communication network may be established between the carbon emission trackers 20a and 20b to the data center 27 via the APs 24a and 24b (S201). The carbon emission trackers 20a and 20b may transmit the identification data of the electrical appliances 60a and 60b to the data center 27. The data center 27 may assign pre-determined time period parameters to the carbon emission trackers 20a and 20b (S203). The assigned time periods may be set by the manufacturer 28 or the user 29.

The carbon emission trackers 20a and 20b may determine if the data transfer interface 209 is connected to the data storage unit 211 (S205). After being powered, if the carbon emission trackers 20a and 20b determine that the data transfer interface 209 is not connected to the data storage unit 211 the carbon emission trackers 20a and 20b may be configured not to detect the actual power consumption of the electrical appliances 60a and 60b. And the carbon emission trackers 20a and 20b may continue their determinations of whether the data transfer interface 209 and the data storage unit 211 are in connection.

If the carbon emission trackers 20a and 20b determine the data transfer interface 209 is connected to the data storage unit 211, the carbon emission trackers 20a and 20b may begin to detect the actual power consumption of the electrical appliances 60a and 60b (S207). The carbon emission trackers 20a and 20b may obtain the electricity usage data of the electrical appliances 60a and 60b by aggregating the actual power consumption over the predetermined time periods (S209). In one implementation, the electricity usage data is temporarily stored to the memory unit 206. The carbon emission trackers 20a and 20b may integrate the electricity usage data and identification data of the electrical appliances 60a and 60b in order to prepare the power consumption data (S211). The power consumption data may be transmitted to the data storage unit 211 through the data transfer interface 209 (S213). Thereafter, the user may remove the data storage unit 211 from the data transfer interface 209 and utilize the electronic devices 21a, 21b, 21c, and 21d to retrieve the power consumption data from the data storage unit 211. While retrieving the data, the electronic devices 21a, 21b, 21c, and 21d may transmit the retrieved power consumption data to the data center 27 simultaneously (S215). In one implementation, the electronic devices 21a, 21b, 21c, and 21d may store the power consumption data before transmitting the power consumption data periodically to the data center 27.

Based on the power consumption data, the data center 27 may calculate the carbon outputs associated with the electrical appliances 60a and 60b (S217). The calculated carbon outputs may be stored to a database so that the manufacturer 28 or the user 29 may download the carbon outputs.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A carbon emission tracker, coupled to a power input end of an electrical appliance, comprising:
   a main body;
   a power input interface disposed on the main body for receiving a power;

a power output interface disposed on the main body and coupled to the power input interface, the power output interface being configured for fitting to a power plug of the electrical appliance;

a power detecting unit disposed between the power input interface and the power output interface;

a processing unit coupled to the power detecting unit and a communication unit;

a memory unit coupled to the processing unit for storing identification data of the electrical appliance; and an ambient detecting unit coupled to the processing unit;

wherein the power detecting unit is configured to detect electricity usage of the electrical appliance, the processing unit is configured to aggregate power consumption data over a time period and store the power consumption data associated with the time period to the memory unit, the ambient detecting unit is configured to detect ambient condition of the electrical appliance at the time of detecting the electricity usage of the electrical appliance and store ambient condition data associated with the time period to the memory unit, and the power consumption data including the identification data and the ambient condition data is transmitted to a data center through the communication unit by the processing unit.

2. The carbon emission tracker of claim 1, wherein the ambient condition of the electrical appliance is temperature.

3. The carbon emission tracker of claim 1, further comprising an indication unit disposed on the main body and coupled to the processing unit, wherein the indication unit is controlled by the processing unit to output an indicating signal according to a signal quality of the communication unit or a power supply state of the power output interface.

4. The carbon emission tracker of claim 1, wherein the memory unit is a flash memory or an electrically-erasable programmable read-only memory (EEPROM).

5. The carbon emission tracker of claim 1, wherein the communication unit is a wireless network module or a wired network module.

6. The carbon emission tracker of claim 1, wherein the identification data of the electrical appliance includes a brand type, a model type, a serial number, specifications, or a power consumption rating.

7. The carbon emission tracker of claim 1, wherein the main body is of a wall-mounted socket or a power adapter.

8. The carbon emission tracker of claim 1, wherein the main body comprises a first body and a second body, the power input interface being disposed on the first body and the power output interface being disposed on the second body and connected by a cable to the power output interface.

9. A carbon emission tracker, coupled to a power input end of an electrical appliance, comprising:

a main body;

a power input interface disposed on the main body for receiving a power;

a power output interface disposed on the main body and coupled to the power input interface, the power output interface being configured for fitting to a power plug of the electrical appliance;

a power detecting unit disposed between the power input interface and the power output interface;

a processing unit coupled to the power detecting unit and a communication unit;

a data transfer interface disposed on the main body and coupled to the processing unit, the data transfer interface being configured for receiving a data storage unit; and an ambient detecting unit coupled to the processing unit;

wherein the power detecting unit is configured to detect electricity usage of the electrical appliance, the ambient detecting unit is configured to detect ambient condition of the electrical appliance at the time of detecting the electricity usage of the electrical appliance, and the processing unit is configured to aggregate power consumption data over a time period and store the power consumption data including identification data of the electrical appliance and ambient condition data of the time period to the data storage unit through the data transfer interface;

wherein the processing unit is configured to determine whether the data transfer interface is connected to the data storage unit; if the processing unit determines that the data transfer interface is not connected to the data storage unit, the carbon emission tracker is configured not to detect the electricity usage of the electrical appliance; if the processing unit determines the data transfer interface is connected to the data storage unit, the carbon emission tracker begins to detect the electricity usage of the electrical appliance.

10. The carbon emission tracker of claim 9, wherein the data transfer interface is a memory card receptacle or a USB (Universal Serial Bus) receptacle, and wherein the data storage unit is a memory card or a USB type data storage device.

11. The carbon emission tracker of claim 9, further comprising an indication unit disposed on the main body and coupled to the processing unit, wherein the indication unit is controlled by the processing unit to output an indicating signal when the data storage unit reaches a full capacity thereof.

12. The carbon emission tracker of claim 9, wherein the identification data is pre-stored to a memory unit that is coupled to the processing unit, wherein the identification data of the electrical appliance includes a brand type, a model type, a serial number, specifications, or a power consumption rating.

13. The carbon emission tracker of claim 9, wherein the identification data is pre-stored to the data storage unit, and wherein the identification data of the electrical appliance includes a brand type, a model type, a serial number, specifications, or a power consumption rating.

14. The carbon emission tracker of claim 9, wherein the main body is of a wall-mounted socket or a power adapter, and wherein the main body comprises a first body on which the power input interface is disposed and a second body on which the power output interface is disposed, and the power input interface is connected by a cable to the power output interface.

15. A carbon emission tracking system, comprising:

a carbon emission tracker in a local area network (LAN), the carbon emission tracker being connected electrically to a power input end of an electrical appliance and a power supply unit, the carbon emission tracker being configured to detect electricity usage and ambient condition of the electrical appliance and aggregate power consumption data including electricity usage data associated with the electricity usage over a time period, ambient conduction data associated with the ambient condition of the time period, and identification data, and a communication unit being included in the carbon emission tracker to transmit the power consumption data;

an access point connected to a wide area network (WAN) for communicating with the carbon emission tracker to receive the power consumption data and output the power consumption data to the WAN; and a data center connected to the WAN, the data center being configured to communicate with the access point to receive the power consumption data for calculating a carbon output.

16. The carbon emission tracking system of claim 15, wherein the data center compares and analyzes a pre-determined power consumption data with the power consumption data before determining if the electrical appliance operates normally, or aggregating the electricity usage of the electrical appliance according to the power consumption data to determine an actual usage of the electrical appliance.

17. An outlet, comprising:
a first body having at least two prongs disposed thereon for receiving a power;
a second body having at least one set of conductive slots disposed thereon, wherein the conductive slots are configured for fitting to a power plug of an electrical appliance;
a cable, wherein the second body is connected to the first body by the cable, and the conductive slots are coupled to the prongs by the cable; and
a USB (Universal Serial Bus) receptacle disposed on the first body.

18. The outlet of claim 17, further comprising:
a power detecting unit disposed in the first body or the second body; and
a processing unit coupled to the power detecting unit and a communication unit;
wherein the power detecting unit is configured to detect electricity usage of the electrical appliance, and the processing unit is configured to aggregate power consumption data over a time period and store the power consumption data including identification data of the electrical appliance to a USB type data storage device through the USB receptacle.

19. The outlet of claim 18, further comprising an ambient detecting unit coupled to the processing unit, wherein the ambient detecting unit is configured to detect ambient condition of the electrical appliance at the time of detecting the electricity usage of the electrical appliance, and the processing unit is configured to store the power consumption data including ambient condition data of the time period to the USB type data storage device through the USB receptacle.

20. The outlet of claim 18, wherein the processing unit is configured to determine whether the USB receptacle is connected to the USB type data storage device; if the processing unit determines that the USB receptacle is not connected to the USB type data storage device, the carbon emission tracker is configured not to detect the electricity usage of the electrical appliance; if the processing unit determines the USB receptacle is connected to the USB type data storage device, the carbon emission tracker begins to detect the electricity usage of the electrical appliance.

* * * * *